(12) United States Patent
Takamatsu et al.

(10) Patent No.: US 7,318,408 B2
(45) Date of Patent: Jan. 15, 2008

(54) VEHICLE CONTROL APPARATUS AND THROTTLE TROUBLE HANDLING METHOD

(75) Inventors: Hideki Takamatsu, Anjo (JP); Shoji Inagaki, Numazu (JP); Yasuhiro Nakai, Anjo (JP); Kenji Kawahara, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 35 days.

(21) Appl. No.: 11/440,120

(22) Filed: May 25, 2006

(65) Prior Publication Data

US 2006/0278197 A1 Dec. 14, 2006

(30) Foreign Application Priority Data

Jun. 14, 2005 (JP) ............................. 2005-173489

(51) Int. Cl.
*F02D 11/10* (2006.01)
*B60G 17/015* (2006.01)
(52) U.S. Cl. ..................... 123/396; 123/399; 701/39; 280/5.5
(58) Field of Classification Search ............... 123/361, 123/396, 399; 701/37, 39; 280/5.5, 5.501
See application file for complete search history.

(56) References Cited

U.S. PATENT DOCUMENTS 5,369,581 A * 11/1994 Ohsuga et al. ............... 701/37
6,182,001 B1 * 1/2001 Sugai et al. .................. 701/78
6,360,148 B1 * 3/2002 Halpin ........................ 701/37
6,745,119 B2 * 6/2004 Ohno et al. ................. 123/399
2004/0065300 A1 * 4/2004 Watabe et al. .............. 123/396

FOREIGN PATENT DOCUMENTS

| JP | 10-238388 | 9/1998 |
|---|---|---|
| JP | 2844918 | 10/1998 |
| JP | 2003-120385 | 4/2003 |
| JP | 2004-168148 | 6/2004 |

* cited by examiner

*Primary Examiner*—T. M Argenbright
(74) *Attorney, Agent, or Firm*—Oblon, Spivak, McClelland, Maier & Neustadt, P.C.

(57) ABSTRACT

For setting a predetermined target control amount concerning running of a vehicle according to an operation amount for a predetermined operation member for running the vehicle, an operation amount obtaining part obtaining the operation amount for the operation member; a trouble determining part determining whether or not a trouble occurs in any one of the operation member and the operation amount obtaining part; a target control amount setting part setting a trouble occasion target control amount which is a target control amount for a trouble occasion when the trouble determining part determines that a trouble occurs in at least any one of the operation member and the operation amount obtaining part; and a correcting part correcting the trouble occasion target control amount set by the trouble occasion target control amount setting part in such a manner that on-spring vibration of the vehicle is damped, are provided.

4 Claims, 11 Drawing Sheets

VEHICLE CONTROL APPARATUS AND THROTTLE TROUBLE HANDLING METHOD

BACKGROUND OF THE INVENTION

1. Field of the Invention

The present invention relates to a vehicle control apparatus which sets a predetermined target control amount according to an operation amount of a predetermined operation member provided for causing the vehicle to run, and controlling the vehicle according to the target control amount, and to a throttle trouble handling method which is applied for when a trouble occurs in at least any one of a throttle pedal and a part of obtaining the throttle pedal operation amount.

2. Description of the Related Art

Recently, a vehicle provided with an electronically controlled throttle valve has been spreading. In such a type of vehicle, a driver's operation amount of the throttle pedal is detected, and the throttle position is controlled electronically according to the throttle pedal operation amount. However, in the vehicle provided with the electronically controlled throttle valve, a trouble may occur in the throttle pedal, the throttle sensor or such. Therefore, Japanese Laid-open Patent Application No. 10-238388 for example discloses a method of controlling a throttle valve position with the use of a second control signal obtained from first order lag processing being executed on a guard signal based on a transmission gear position and a vehicle speed when a trouble occurs in a communication part, for achieving a safe saving running for when a trouble occurs in the communication part receiving a signal indicating a throttle valve operation amount.

Further, Japanese Patent No. 2844918 for example discloses a method for controlling a throttle valve so as to reduce each of a vehicle speed and an engine speed, to not more than a predetermined threshold, to deal with a trouble of a throttle pedal, a throttle sensor or such. Further, Japanese Laid-open Patent Application No. 2003-120385 for example discloses a method in which, for a trouble in a throttle sensor or such, a throttle valve is controlled by an assumption of a full throttle occasion.

It is noted that, conventionally, as an apparatus for controlling vibration of a vehicle, a control apparatus is known by which, with an input instruction corresponding to at least any one of a driver's throttle operation, steering operation and brake operation, at least any one, corresponding to the input instruction, of an engine and a brake is controlled (see Japanese Laid-open Patent Application No. 2004-168148 for example). In this vehicle control apparatus, for the purpose of controlling vibration of the vehicle, the driver's input instruction is corrected based on a motion model for vibration occurring due to the driver's input instruction, i.e., at least any one of vertical or twisting vibration due to road surface reaction force; vehicle body under-spring vibration in the suspension; and the vehicle body on-spring vibration received by the vehicle body itself.

SUMMARY OF THE INVENTION

According to any of the above-described prior arts, basically, a trouble (simply refereed to as 'throttle trouble', hereinafter) of at least any one of a throttle pedal and a throttle sensor is dealt with, as a result of, on the occasion of the throttle trouble, the throttle valve position being simply slightly changed or gradually changed. That is, in these prior arts, a factor of damping vibration of the vehicle occurring in connection with the control of the throttle valve after the occurrence of the throttle trouble is not concerned. Therefore, in these prior arts, pitching or such may occur and behavior of the vehicle may become unstable, when the throttle valve is controlled in response to the throttle trouble.

The present invention has been devised in consideration of such a situation, and an object of the present invention is to provide a vehicle control apparatus and a throttle trouble handling method by which, even when a trouble occurs in an operation member such as a throttle pedal or a part of obtaining the throttle pedal operation amount, vibration of the vehicle can be satisfactorily damped, and the vehicle behavior can be stabilized.

A vehicle control apparatus according to the present invention which sets a predetermined target control amount concerning running of a vehicle according to an operation amount of a predetermined operation member for running the vehicle, includes: an operation amount obtaining part obtaining the operation amount of the operation member; a trouble determining part determining whether or not a trouble occurs in at least any one of the operation member and the operation amount obtaining part; a target control amount setting part setting a trouble occasion target control amount which is the target control amount for trouble occasion, when the trouble determining part determines that a trouble occurs in at least any one of the operation member and the operation amount obtaining part; and a correcting part correcting the trouble occasion target control amount set by the trouble occasion target control amount setting part in such a manner as to damp on-spring vibration of the vehicle.

In this vehicle control apparatus, the trouble determining part is provided for determining whether or not a trouble occurs in at least any one of the operation member and the operation amount obtaining part; a target control amount setting part sets the trouble occasion target control amount which is a target control amount for trouble occasion, when the trouble determining part determines that a trouble occurs in at least any one of the operation member and the operation amount obtaining part. Further, the correcting part corrects the trouble occasion target control amount set by the trouble occasion target control amount setting part in such a manner as to damp on-spring vibration of the vehicle. Thereby, when it is determined that a trouble occurs in the operation member or the operation amount obtaining part, vibration of the vehicle can be satisfactorily damped, the vehicle behavior can be thus stabilized, and as a result, the vehicle running state can be smoothly shifted to a running state based on the trouble occasion target control amount.

The operation member may preferably be a throttle pedal, and the target control amount may preferably be a target driving power of the vehicle. Further, a target throttle position obtaining part, which obtains a predetermined trouble occasion target throttle position which is a throttle valve target position for trouble occasion, when the trouble determining part determines that a trouble occurs in at least any one of the operation member and the operation amount obtaining part, may preferably be provided. Further, the target control amount setting part may preferably set the trouble occasion target driving power based on the trouble occasion target throttle position obtained by the target throttle position obtaining part.

In general, in a vehicle in which a throttle valve position is set according to a throttle pedal operation amount, a trouble occasion target throttle position is previously determined for when a trouble occurs in the throttle pedal, the throttle sensor, which is provided for obtaining the throttle pedal operation amount, or such. Accordingly, by thus setting the trouble occasion target driving power based on the trouble occasion target throttle position and correcting the target driving power by the correcting part when a trouble occurs in the throttle pedal or such, as in the present vehicle control apparatus, it is possible to damp vibration of the vehicle very satisfactorily when it is determined that a trouble occurs in the throttle pedal or the throttle sensor and thus the vehicle running state is to be shifted into a running state based on the trouble occasion target throttle position.

The correcting part may preferably be a quadratic notch filter having attenuation characteristics such as to attenuate the on-spring vibration of the vehicle.

Generally speaking, a transfer function having an input of a vehicle target driving power and an output of the vehicle suspension stroke (for example, a rear suspension stroke) can be expressed in a quadratic/quartic transfer function. The quadratic/quartic transfer function includes two quadratic transfer functions. One thereof does not induce vibration, while the other induces vibration. Accordingly, vibration of the vehicle can be very satisfactorily damped, as a result of the target driving power being corrected with the use of the quadratic notch filter for canceling the pole of the quadratic transfer function inducing vibration included in the quadratic/quartic transfer function, when it is determined that a trouble occurs in the throttle pedal or the throttle sensor and thus the vehicle running state is to be shifted into a running state based on the trouble occasion target throttle position.

A throttle trouble handling method according to the present invention applied for a case where a trouble occurs in at least any one of a throttle pedal of a vehicle and a throttle operation amount obtaining part configured to obtain the throttle pedal operation amount, includes the steps of: determining whether or not a trouble occurs in at least any one of the throttle pedal of the vehicle and the throttle operation amount obtaining part; setting a trouble occasion target throttle position which is a target throttle position for trouble occasion when the trouble determining part determines that a trouble occurs in at least any one of the throttle pedal of the vehicle and the throttle operation amount obtaining part; setting a trouble occasion target driving power which is a the vehicle target driving power for trouble occasion, based on the trouble occasion target throttle position; and correcting the trouble occasion target control amount in such a manner as to damp on-spring vibration of the vehicle.

According to the present invention, even when a trouble occurs in an operation member such as a throttle pedal or a part of obtaining its operation amount, vibration of the vehicle can be satisfactorily damped, and the vehicle behavior can be stabilized.

BRIEF DESCRIPTION OF DRAWINGS

Other objects and further features of the present invention will become more apparent from the following detailed description when read in conjunction with the accompanying drawings.

DETAILED DESCRIPTION OF THE PREFERRED EMBODIMENTS

With reference to figures, embodiments of the present invention will now be described in detail.

Figure 1:
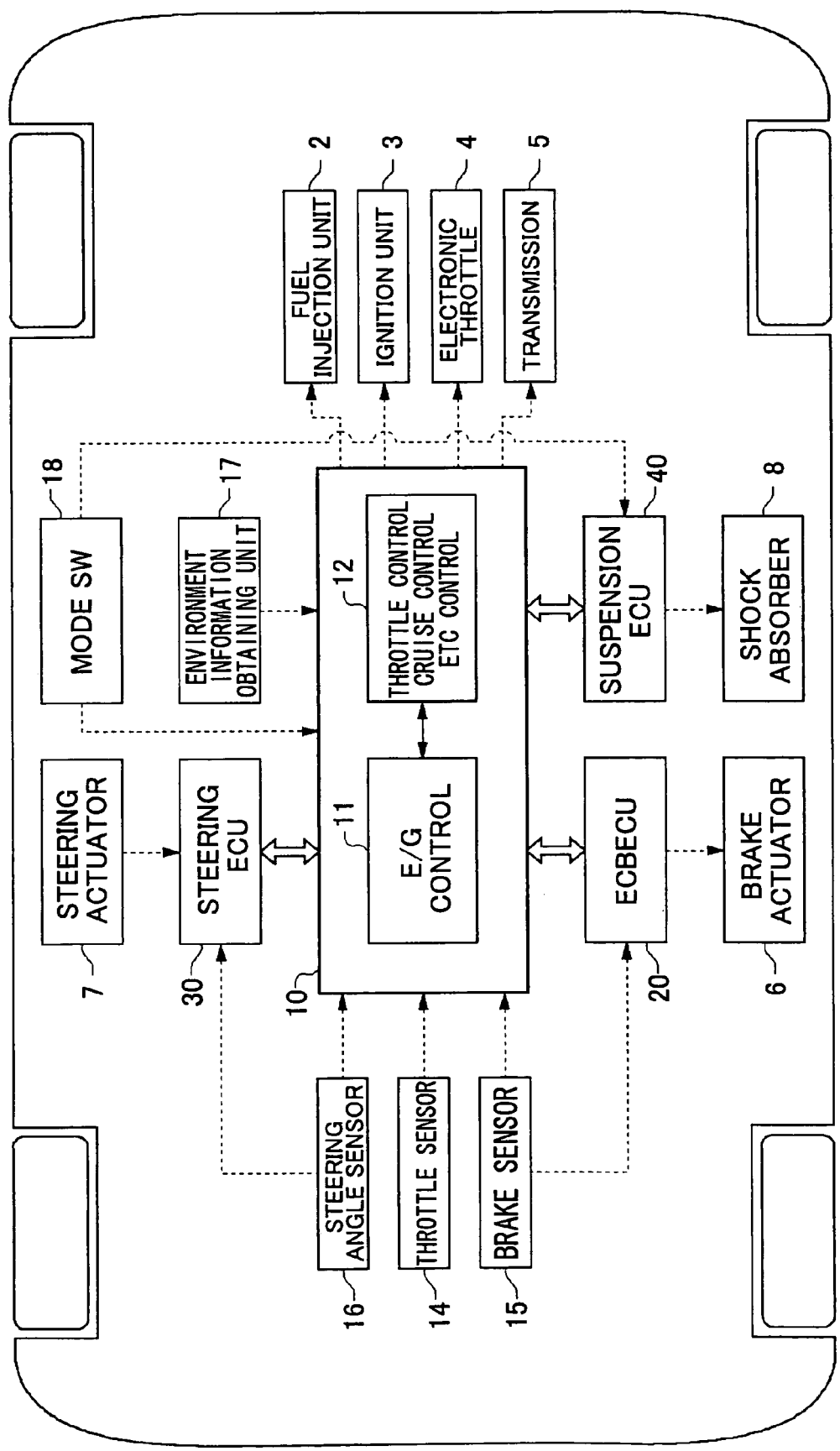
FIG. 1 shows a block diagram of a vehicle in which a vehicle control apparatus according to the present invention is employed.

FIG. 1 shows a block configuration diagram of a vehicle employing a vehicle control apparatus according to the present invention. The vehicle 1 shown includes, as a running driving prime mover, an internal combustion engine such as a gasoline engine or a diesel engine, not shown, is provided. The internal combustion engine includes a fuel injection unit 2, an ignition unit 3 and an electronically controlled throttle valve 4 (simply refereed to as 'a throttle valve 4', hereinafter). Further, the vehicle 1 is provided with a transmission 5, transmitting power generated by the internal combustion engine to a driving shaft, such as a continuously variable transmission. Further, the vehicle 1 includes an electronically controlled brake system including a brake actuator 6 electronically controlled according to a brake pedal operation amount, a steering unit including a steering actuator 7 such as a variable gear mechanism or an electronic assistance system, and further, the vehicle 1 includes an electronically controlled suspension including a plurality of shock absorbers 8 electronically controlled to change an attenuation force.

The internal combustion engine and the transmission of the vehicle 1 are controlled by a driving control electronic control unit (simply referred to as 'a driving control ECU', hereinafter, and similarly, 'electronic control unit' being abbreviated by 'ECU' at every occurrence) 10 acting as a vehicle control apparatus according to the present invention. The driving control ECU 10 has a first processor 11 and a second processor 12, each executing various sorts of arithmetic operation. The first processor 11 and the second processor 12 each includes a CPU executing various sorts of arithmetic operation, a ROM storing various sorts of control programs, a RAM used as a data storage or as a work area for executing various sorts of programs, an input/output interface, a storage unit, and so forth (each not shown). To the driving control ECU 10, a throttle sensor 14, a brake sensor 15 and a steering angle sensor 16 are connected via a bus or such not shown.

The throttle sensor 14 detects the driver's operation amount of the throttle pedal, and provides a signal indicating the detected value to the driving control ECU 10. The brake sensor 15 detects the driver's operation amount of the brake pedal, and provides a signal indicating the detected value to the driving control ECU 10. Further, the steering angle sensor 16 detects the driver's steering amount of a steering wheel, i.e., a steering angle, and provides a signal indicating the detected value to the driving control ECU 10. The driving control ECU 10 controls the above-mentioned fuel injection unit 2, the ignition unit 3, the throttle valve 4 and the transmission 5 for meeting the driver's requests, according to the driver's requests represented by the signals provided by these respective sensors as well as detection values of other sensors not shown. In the present embodiment, the fuel injection unit 2 and the ignition unit 2 of the internal combustion engine are mainly controlled by the first processor 11 of the driving control ECU 10 and the throttle valve 4 is mainly controlled by the second processor 12 of the driving control ECU 10. Further, the second processor 12 controls the transmission 5, and also, acts as a so-called cruise controller which supports and substitutes for the driver's operation of driving the vehicle 1. The driving control ECU 10 should not necessarily be configured to control both the internal combustion engine and the transmission 5. The driving control ECU 10 is configured to control at least any one of the internal combustion engine and the transmission 5.

In addition, the driving control ECU 10 is connected by an environment information obtaining unit 17 and a mode switch 18 via a bus or such. In the present embodiment, the environment information obtaining unit 17 includes a navigation system, a road traffic information communication system (VICS), and a vehicle distance obtaining imaging unit or a vehicle distance sensor. The environment information obtaining unit 17 obtains information such as a running road surface state, a vehicle distance or such, and provides the obtained information to the driving control ECU 10. The environment information obtaining unit 17 may include a radar unit for obtaining various sorts of information.

A mode switch 18 is used for switching an attenuation force of the plurality of shock absorbers 8 included in the above-mentioned electronically controlled suspension system. By controlling the mode switch 18, running characteristics of the vehicle 1, i.e., a running mode can be changed. In the present embodiment, when the mode switch is turned on by the driver, the attenuation force of each shock absorber 8 is set in a standard value, and thereby, running characteristics of the vehicle 1 are set in a normal mode. When the mode switch 18 is turned on and is set in 'mode 1', the attenuation force of each shock absorber 8 is set harder than normal, and thereby, the running characteristics of the vehicle are set in a power mode. In the power mode, acceleration performance is given priority than vibration damping of the vehicle 1. When the mode switch is turned on and set in 'mode 2', the attenuation force of each shock absorber 8 is set softer than normal, and thereby, the running characteristics of the vehicle 1 are set in a comfort mode. In the comfort mode, vibration damping is given priority than acceleration performance.

The driving control ECU 10 is also connected, via a bus or such or, via a radio communication, each not shown, by an ECBECU 20, a steering ECU 30 and a suspension ECU 40. The ECBECU 20 controls the electronically controlled brake system, and controls the brake actuator 6 and so forth based on detection values of various sorts of sensors, such as a brake sensor 15. The ECBECU 20 in the present embodiment is configured to be able to also execute vehicle stability control for ensuring stability in a turning direction of the vehicle 1. The steering ECU 30 controls the steering unit of the vehicle 1, and controls the steering actuator 7 and so forth based on detection values of various sorts of sensors such as the steering angle sensor 16. The suspension ECU controls the above-mentioned electronically controlled suspension, and carries out switching control of the attenuation force of each shock absorber 8 according to operation of the mode switch 18 by the driver. To the above-mentioned driving control ECU 10, ECBECU 20, steering ECU 30 and suspension ECU 40, information necessary for control is provided by various sorts of sensors such as a throttle position sensor, a vehicle speed sensor, a forward/backward acceleration sensor, a yaw rate sensor, and so forth.

Figure 2:
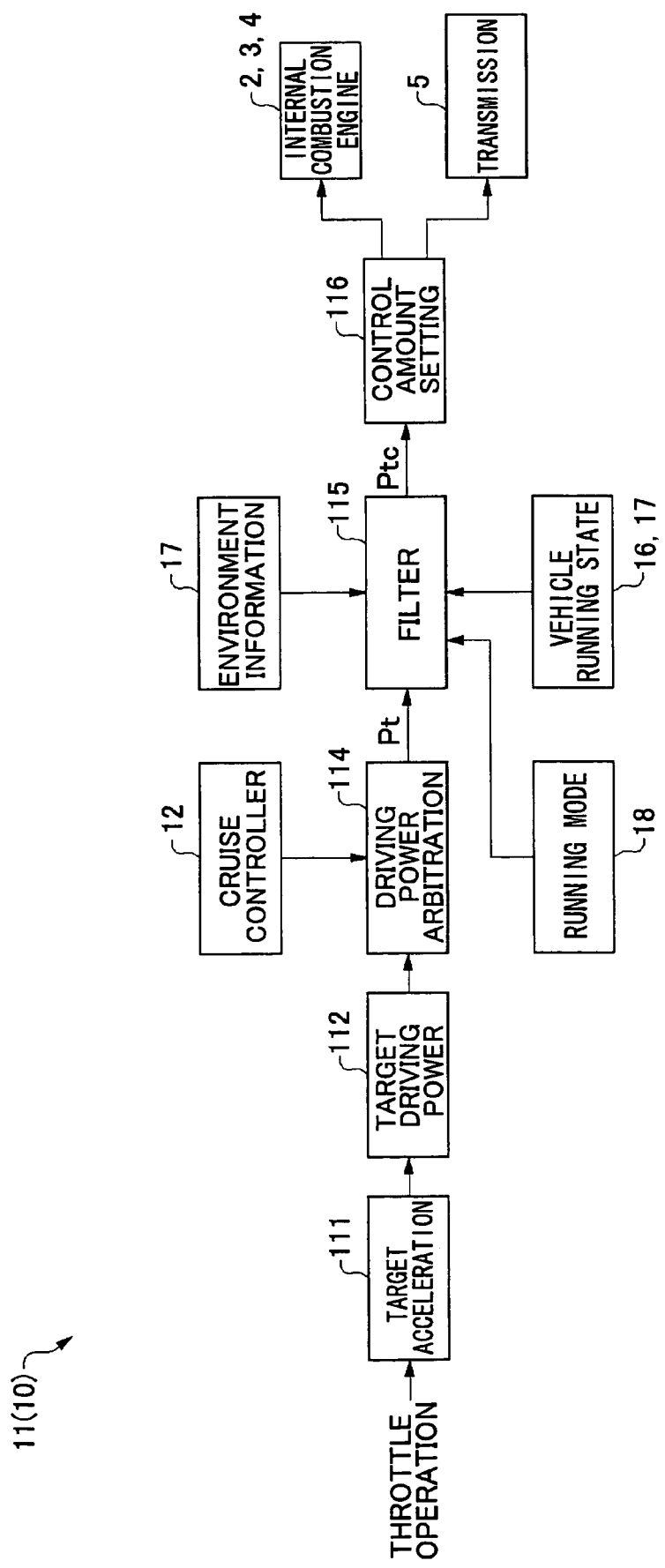
FIG. 2 shows a block diagram illustrating a basic control procedure for an internal combustion engine and a transmission carried out by the vehicle control apparatus according to the present invention.

FIG. 2 shows a block diagram illustrating a basic control procedure of the internal combustion engine and the transmission acting as driving units controlled by the driving control ECU 10. Control concerning the figure is basically carried out by the first processor 11 of the driving control ECU 10. As shown in FIG. 2, in the first processor 11, a target acceleration obtaining part 111, a target driving power obtaining part 112, a driving power arbitration part 114, a filter 115 and a control amount setting part 116 are established. The target acceleration obtaining part 111 uses as a map or such, defining relationship between the throttle operation amount and target acceleration of the vehicle 1, obtains therefrom the target acceleration of the vehicle according to the throttle operation amount indicated by the signal from the throttle sensor 14, and provides the signal indicating the obtained value, to the target driving power obtaining part 112. The target driving power obtaining part 112 uses a map or such, defining relationship between the target acceleration and target driving power of the internal combustion engine, and obtains the target driving power of the internal combustion engine according to the target acceleration obtained from the target acceleration obtaining part 111. The target driving power obtaining part 112 provides the signal indicating the thus-obtained value, to the driving arbitration part 114.

The driving arbitration part 114 sets the target driving power P based on the signal from the target driving power obtaining part 112 and at least any one of a request of the driver and a request from the second processor 12 which is a control unit included in the vehicle 1. That is, in the present embodiment, the second processor 12 of the driving control ECU 10 also acts as the so-called cruise controller which supports or substitutes for the driver's operation on the vehicle 1. Accordingly, when the driver requests an execution of cruise control, the second processor 12 provides required driving power for the cruise control to the driving arbitration part 114 of the first processor 11. In such a case, the driving power arbitration part 114 basically adds the required driving power from the second processor to the target driving power from the target driving power obtaining part 112, and thus, sets a target driving power Pt of the internal combustion engine. It is noted that, when the sum total of the target driving power from the target driving power obtain part 112 and the required driving power from the second processor 12 goes beyond a predetermined guard range, the driving arbitration part 114 executes guard processing for setting the thus-obtained target driving power Pt to the upper or lower limit of the guard range. The guard processing may be configured in such a manner as to invalidate the request from the second processor 12 when the target driving power Pt goes beyond the guard range.

The filter 115 corrects the final target driving power Pt set by the driving power arbitration part 114 in such a manner as to damp on-spring vibration of the vehicle 1. In the present embodiment, as the filter 115, a quadratic notch filter is employed. Output from the filter 115, i.e., a target driving power Ptc after the correction is provided to the control amount setting part 116. The control amount setting part 116 determines control amounts for the fuel injection unit 2, the ignition unit 3 and the throttle valve 4 of the internal combustion engine and the transmission 5, based on the target driving power Ptc after the correction. The first processor 11 or the second processor 12 generates control signals for the fuel injection unit 2, the ignition unit 3, the throttle valve 4 and the transmission 5 based on the control amounts determined by the control amount setting part 116, and provides them to the respective units. Thereby, the internal combustion engine and the transmission 5 are controlled according to the driver's requests.

A reason why the above-mentioned quadratic notch filter acting as the filter 115 is employed for the first processor 11 of the driving control ECU 10 in the present embodiment is as follows: That is, for example, the vehicle 1 is of a rear wheel drive type, a transfer function having an input of the vehicle target driving power and an output of the vehicle rear suspension stroke is expressed by a quadratic/quartic transfer function of the following formula (1):

$$Px_r(s) = K \cdot \frac{\omega_{n1}^2 \cdot \omega_{n2}^2}{z_1 \cdot z_2} \cdot \frac{s - z_1}{s^2 + 2\xi_1 \cdot \omega_{n1} \cdot s + \omega_{n1}^2} \cdot \frac{s - z_2}{s^2 + 2\xi_2 \cdot \omega_{n2} \cdot s + \omega_{n2}^2} \quad (1)$$
$$= K \cdot G_1(s) \cdot G_2(s)$$

In this quadratic/quartic transfer function, the two quadratic transfer functions $G_1(s)$ and $G_2(s)$ are included. However, when the formula (1) is identified, the value of the attenuation ratio $\xi_1$ in the left quadratic transfer function $G_1(s)$ is vibrating while the value of the attenuation ratio $\xi_2$ in the right quadratic transfer function $G_2(s)$ is non-vibrating. Accordingly, the quadratic function $G_2(s)$ in the right term does not induce vibration while the quadratic function $G_1(s)$ in the left term induces vibration. Accordingly, by correcting the target driving power Pt as the target control amount with the use of the notch filter 115 configured in the quadratic notch filter which cancels the pole of the quadratic transfer function $G_1(s)$ inducing vibration included in the quadratic/quartic transfer function of the formula (1), vibration of the vehicle 1 can be damped.

The quadratic notch filter canceling the pole of the quadratic transfer function $G_1(s)$ has a form of quadratic/quadratic transfer function, and can be expressed by the following formula (2) where $\omega_m$ denotes a standard frequency, $\xi_m$ denotes a standard attenuation ratio, $\omega_p$ denotes a plant frequency of a driving system of the vehicle 1 acting as a plant, and $\xi_p$ denotes a plant attenuation ratio. Accordingly, in the first processor 11 of the driving control ECU 10, the filter 115 configured to correct the target driving power Pt based on the correcting formula (2) is provided.

$$C(s) = \frac{s^2 + 2\xi_p \cdot \omega_p \cdot s + \omega_p^2}{s^2 + 2\xi_m \cdot \omega_m \cdot s + \omega_m^2} \quad (2)$$

In this case, when running characteristics, i.e., the running mode, the running environment or the running state of the vehicle 1, or such, changes, the parameters, i.e., the standard frequency $\omega_m$, the standard attenuation ratio $\xi_m$, the plant frequency $\omega_p$ and the plant attenuation ratio $\xi_p$ have values different according to the change. Accordingly, on the occasion of the correction of the target driving power Pt with the use of the filter 115, vibration of the vehicle 1 can be satisfactorily damped as a result of the parameters, i.e., the standard frequency $\omega_m$, the standard attenuation ratio $\xi_m$, the plant frequency $\omega_p$ and the plant attenuation ratio $\xi_p$ which define the attenuation characteristics (correcting formula) being changed according to the running mode, the running environment and the running state of the vehicle 1 set by the driver.

Figure 3:
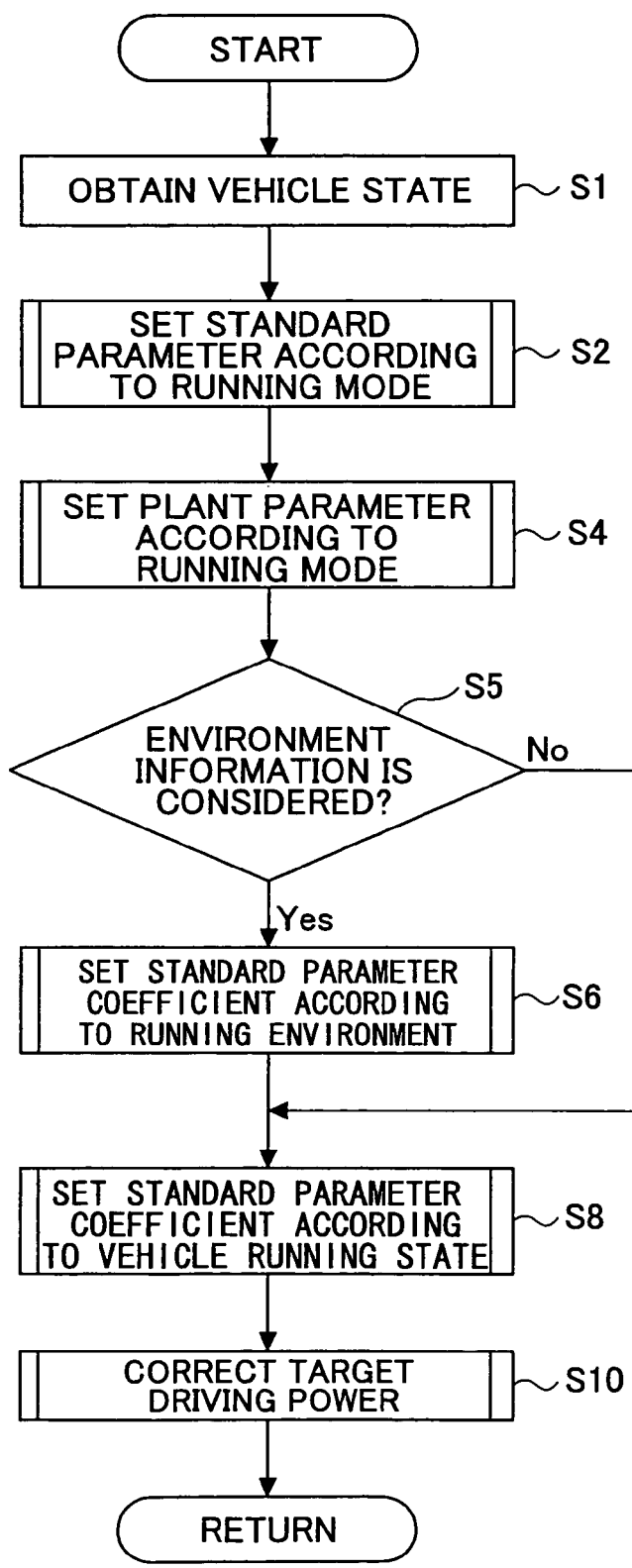
FIG. 3 shows a flow chart illustrating a procedure of correcting a target driving power with changing filter parameters according to the vehicle's running characteristics, running environment and running state.

In the vehicle 1 according to the present embodiment, a routine shown in FIG. 3 is executed for correcting the above-mentioned target driving power Pt with a change in the parameters which define the attenuation characteristics of the filter 115 according to the running mode, the running environment and the running state of the vehicle 1. The routine of FIG. 3 is repeatedly executed every predetermined time interval by the first processor 11 of the driving control ECU 10. First, the states of the vehicle 1 such as the vehicle speed, an operation amount of the throttle pedal or the brake pedal, or such, is obtained (S1), and then, standard parameter setting processing (S2) is carried out for setting the respective standard parameters of the filter 115 according to the running mode of the vehicle 1.

After the processing of S2, the first processor 11 executes plant parameter setting processing (S4) for setting the respective plant parameters of the filter 115 according to the running mode of the vehicle 1. Further, it determines whether or not the running environment of the vehicle 1 should be considered on the occasion of the correction processing by the filter 115 (S5). When determining, according to a predetermined criterion, that the running environment of the vehicle 1 should be considered on the occasion of the correction processing by the filter 115 (Yes in S5), the first processor 11 executes processing (S6) of setting standard parameter coefficients for therewith multiplying the respective standard plant parameters of the filter 11 according to the environment information obtained by the environment information obtaining unit 17. It is noted that when it is determined that the running environment should not be considered on the occasion of the correction processing by the filter 115 (No in S5), the processing (S6) of setting of the standard parameter coefficients is skipped. Next, the first processor 11 executes processing (S8) of setting the standard parameter coefficients for therewith multiplying the standard parameters of the filter 11, and then, executes the correction processing (S10) for the target driving power Pt with the use of the filter 115.

Figure 4:
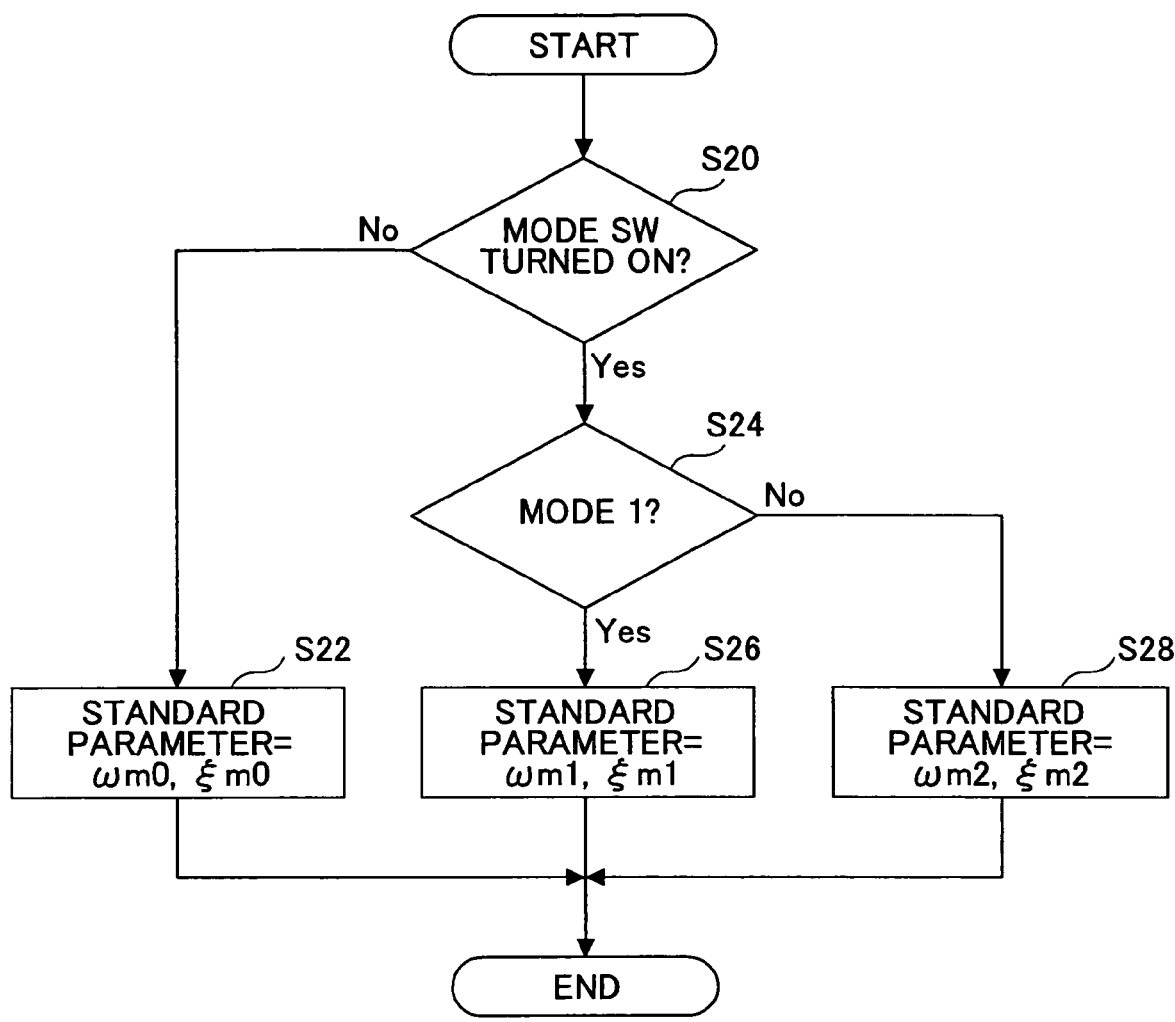
FIG. 4 shows a flow chart illustrating standard parameter setting processing executed on the occasion of correcting the target driving power.

FIG. 4 shows a flow chart illustrating the standard parameter setting processing of S2. As shown in FIG. 4, the first processor 11 of the driving control ECU 10 first determines (S20) whether or not the mode switch 18 is turned on. When determining that the mode switch 18 is turned off and the running mode of the vehicle 1 is set in the normal mode by the driver (No in S20), the first processor 11 reads, from a predetermined storage device, the standard frequency $\omega m0$ and the standard attenuation ratio $\xi m0$ for the normal mode, and stores these values in a predetermined storage area as respective base standard parameters (S22).

On the other hand, when determining that the mode switch 18 is tuned on (Yes in S20), the first processor 11 further determines (S24) whether or not the mode switch 18 is set in 'mode 1' for giving priority to the acceleration performance of the vehicle 1. When determining that the mode switch 18 is set in the 'mode 1' and thus the driver sets the running mode of the vehicle 1 in the power mode (Yes in S24), the first processor 11 reads the standard frequency $\omega m1$ and the standard attenuation ratio $\xi m1$ for the power mode from the predetermined storage device, and stores, in the predetermined storage area, these values as the base standard parameters, respectively (S26).

Further, when it is determined in S20 that the mode switch 18 is turned on and it is determined in S24 that the mode switch 18 is not set in 'mode 1', it can be determined that the driver sets the running mode in 'mode 2', i.e., the comfort mode is set in which vibration damping of the vehicle 1 is given priority (No in S24). Accordingly, when the negative determination is made in S24, the first processor 11 reads the standard frequency $\omega m2$ and the standard attenuation ratio $\xi m2$ for the comfort mode from the predetermined storage device, and stores these values as the base standard parameters in the predetermined storage area (S28).

It is noted that the standard parameters $\omega m0$, $\xi m0$, $\omega m1$, $\xi m1$, $\omega m2$, $\xi m2$ for the normal mode, power mode and comfort mode, respectively, are previously identified through experiment/analysis, and stored in the storage device of the driving control ECU 10. Further, hereinafter, the standard parameters $\omega m0$, $\xi m0$, $\omega m1$, $\xi m1$, $\omega m2$, $\xi m2$ may be generally referred to as $\omega mi$ and $\xi mi$, appropriately. The suffix i mean the running mode of the vehicle 1 set via the mode switch 18. That is, i=0 means the normal mode; i=1 means the power mode; and i=2 means the comfort mode.

Figure 5:
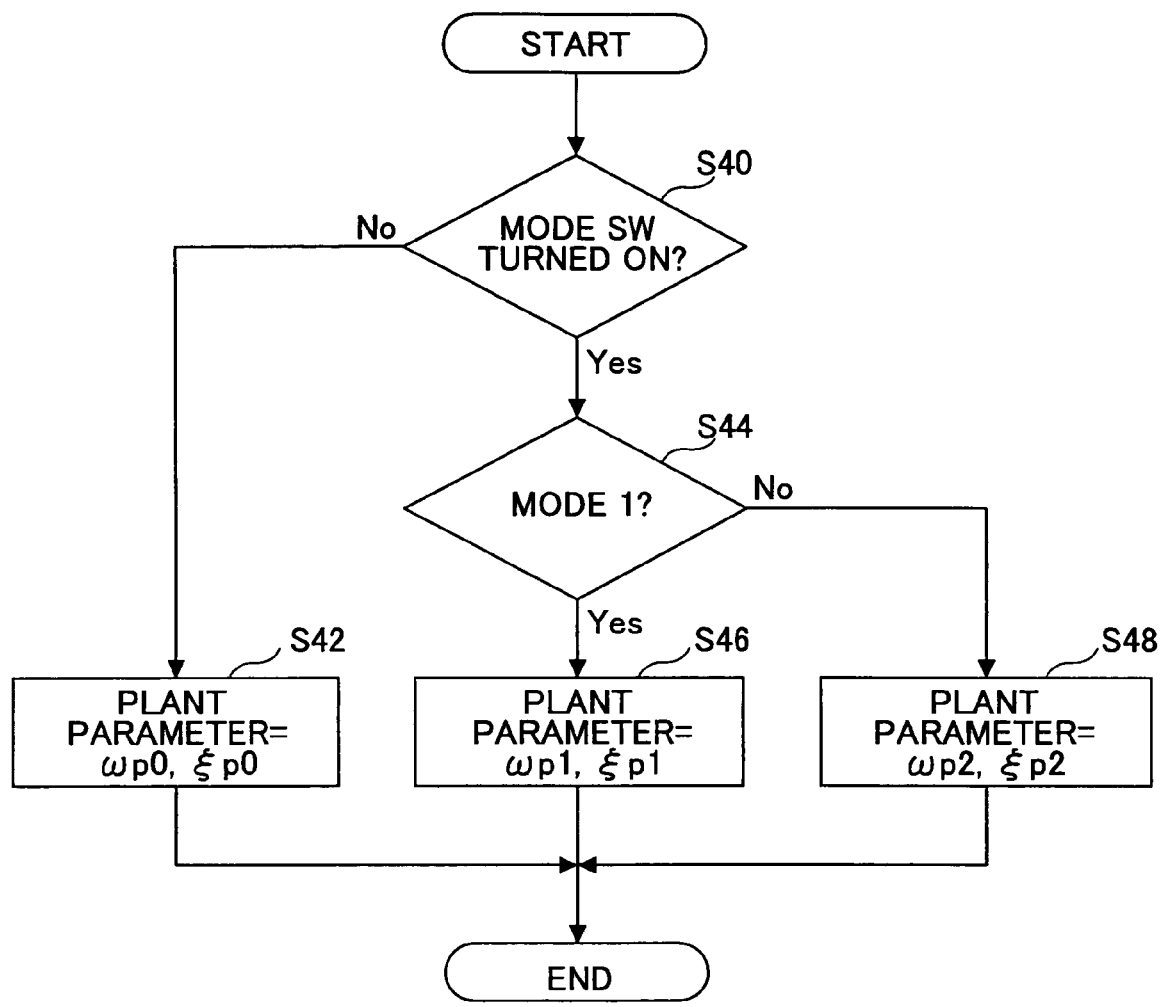
FIG. 5 shows a flow chart illustrating plant parameter setting processing executed on the occasion of correcting the target driving power.

When the standard frequency $\omega mi$ and the standard attenuation ratio $\xi mi$ are set in S22, S26 or S28, the plant parameter setting processing of S4 is carried out. FIG. 5 shows a flow chart illustrating the plant parameter setting processing of S4. Also in this case, the first processor 11 of the driving control ECU 10 determines (S40) whether or not the mode switch 18 is turned on. When determining that the mode switch 18 is turned off and thus the driver sets the running mode of the vehicle 1 in the normal mode (No in S40), the first processor 11 reads, from the predetermined storage device, the plant frequency $\omega p0$ and the plant attenuation ratio $\xi p0$ for the normal mode, and stores these values in the predetermined storage area as respective base plant parameters (S42).

On the other hand, when determining that the mode switch 18 is tuned on (Yes in S40), the first processor 11 further determines (S44) whether or not the mode switch 18 is set in 'mode 1' for giving priority to the acceleration performance of the vehicle 1. When determining that the mode switch 18 is set in the 'mode 1' and thus the driver sets the running mode of the vehicle 1 in the power mode (Yes in S44), the first processor 11 reads the plant frequency $\omega p1$ and the plant attenuation ratio $\xi p1$ for the power mode from the predetermined storage device, and stores, in the predetermined storage area, these values as the base plant parameters, respectively (S46). Further, when it is determined in S40 that the mode switch 18 is turned on and it is determined in S44 that the mode switch 18 is not set in 'mode 1', it can be determined that the driver sets the running mode in 'mode 2', i.e., the comfort mode is set in which vibration damping of the vehicle 1 is given priority (No in S44). Accordingly, when the negative determination is made in S44, the first processor 11 reads the standard frequency $\omega p2$ and the standard attenuation ratio $\xi p2$ for the comfort mode from the predetermined storage device, and stores these values as the base plant parameters in the predetermined storage area (S48).

It is noted that the plant parameters $\omega m0$, $\xi p0$, $\omega p1$, $\xi p1$, $\omega p2$, $\xi p2$ for the normal mode, power mode and comfort mode, respectively, are previously identified through experiment/analysis, and stored in the storage device of the driving control ECU 10. Further, hereinafter, the plant parameters $\omega p0$, $\xi p0$, $\omega p1$, $\xi p1$, $\omega p2$, $\xi p2$ may be generally referred to as $\omega pi$, $\xi pi$, appropriately. The suffix i mean the running mode of the vehicle 1 set via the mode switch 18. It is noted that the electronically controlled suspension of the vehicle 1 also has a vehicle height adjustment function, and, when setting of a plurality of vehicle heights are allowed for the respective running modes, for example, plant parameters may preferably be prepared for the normal mode, power mode and comfort mode, corresponding to the plurality of vehicle heights, and the respective parameter may preferably be set corresponding to the set vehicle height.

Figure 6:
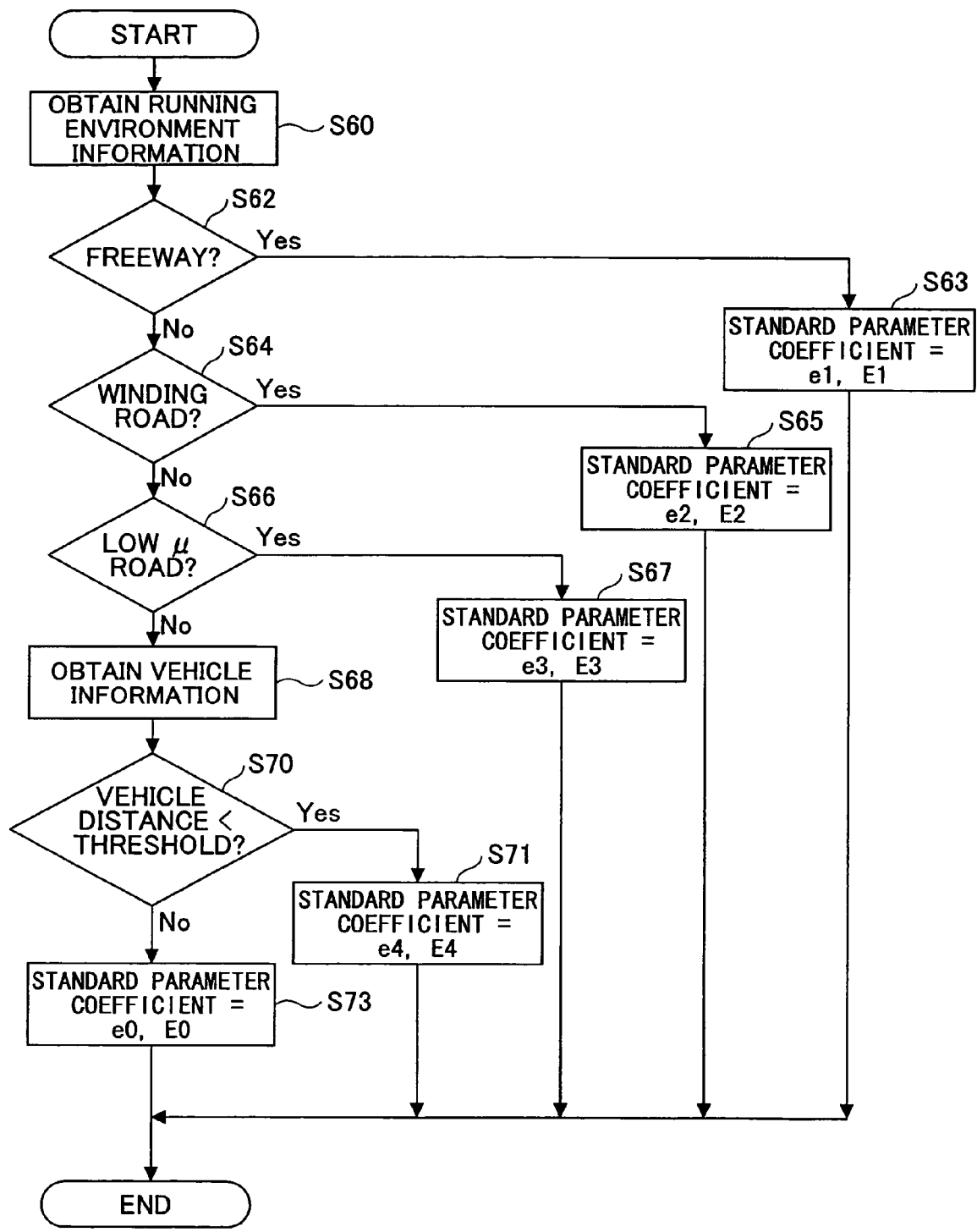
FIG. 6 shows a flow chart illustrating standard parameter coefficient setting processing carried out according to the vehicle running environment.

When the standard frequency $\omega pi$ and the standard attenuation ratio $\xi pi$ are set in S42, S46 or S48, and also, the affirmative determination is made in S5, the standard parameter coefficient setting processing of S6 is then carried out. FIG. 6 shows a flow chart illustrating processing of setting the standard parameters coefficients according to the running environment of the vehicle 1. As shown, on the occasion of setting of the standard parameter coefficients according to the running environment, the first processor 11 of the driving control ECU 10 obtains information concerning the running environment of the vehicle 1 from the navigation system or such included in the environment information obtaining unit 17 (S60). Then, the first processor 11 determines (S62), based on the information concerning the running environment of the vehicle 1 obtained in S60, whether or not the vehicle 1 runs on a freeway such as an express highway or such. When determining that the vehicle 1 runs on a freeway (Yes in S62), the first processor 11 reads a standard parameter coefficient e1 for therewith multiplying the standard parameter $\omega mi$ determined by means of the standard parameter setting processing S2, and a standard parameter coefficient E1 for therewith multiplying the standard parameter $\omega mi$, for when the vehicle 1 runs on a freeway, and stores them in the predetermined storage area (S63).

When determining that the vehicle 1 does not run on a freeway (No in S62), the first processor 11 determines (S64), based on the information concerning the running environment of the vehicle 1, whether or not the vehicle 1 runs on a winding road. When determining that the vehicle 1 runs on a winding road (Yes in S64), the first processor 11 reads a standard parameter coefficient e2 for therewith multiplying the standard parameter $\omega mi$ determined by means of the standard parameter setting processing S2, and a standard parameter coefficient E2 for therewith multiplying the standard parameter $\xi mi$, for when the vehicle 1 runs on a winding road, and stores them in the predetermined storage area (S65).

When determining that the vehicle 1 does not run on a winding road (No in S64), the first processor 11 determines (S66), based on the information concerning the running environment of the vehicle 1, whether or not the vehicle 1 runs on a low µ road. When determining that the vehicle 1 runs on a low µ road (Yes in S66), the first processor 11 reads a standard parameter coefficient e3 for therewith multiplying the standard parameter ωmi determined by means of the standard parameter setting processing S2, and a standard parameter coefficient E3 for therewith multiplying the standard parameter ξmi, for when the vehicle 1 runs on a low μ road, and stores them in the predetermined storage area (S67).

When determining that the vehicle 1 does not run on a low μ road (No in S66), the first processor 11 obtains a vehicle distance from a front vehicle from a imaging unit or such prepared for obtaining a vehicle distance included in the environment information obtaining unit 17 (S68), and determines (S70) whether or not the vehicle distance from the front vehicle is less than a predetermined threshold. When the vehicle distance from the front vehicle is less than the threshold (No in S70), the first processor 11 reads a standard parameter coefficient e4 for therewith multiplying the standard parameter ωmi determined by means of the standard parameter setting processing S2, and a standard parameter coefficient E4 for therewith multiplying the standard parameter ξmi, for when the vehicle distance from the front vehicle is small, and stores them in the predetermined storage area (S71).

When determining that the vehicle distance from the front vehicle is not less than the threshold (No in S70), the first processor 11 determines that the vehicle 1 runes on an ordinary road, which has not many other cars, and reads a standard parameter coefficient e0 for therewith multiplying the standard parameter ωmi determined by means of the standard parameter setting processing S2, and a standard parameter coefficient E0 for therewith multiplying the standard parameter ξmi, for when running on an ordinary road in an ordinary state, and stores them in the predetermined storage area (S73). It is noted that the standard parameter coefficients e0, E0, e1, E1, e2, E2, e3, E3 and e4, E4 are previously identified through experiment/analysis, and stored in the storage device of the driving control ECU 10. Further, hereinafter, the standard parameter coefficients e0, E0, e1, E1, e2, E2, e3, E3 and e4, E4 may be generally referred to as ej, Ej, appropriately. The suffix j means the running environment of the vehicle 1. That is, j=0 means ordinary running on an ordinary road; j=1 means running on a freeway; j=2 means running on a winding road; j=3 means running on a low μ road; and j=4 means running with the small vehicle distance.

Figure 7:
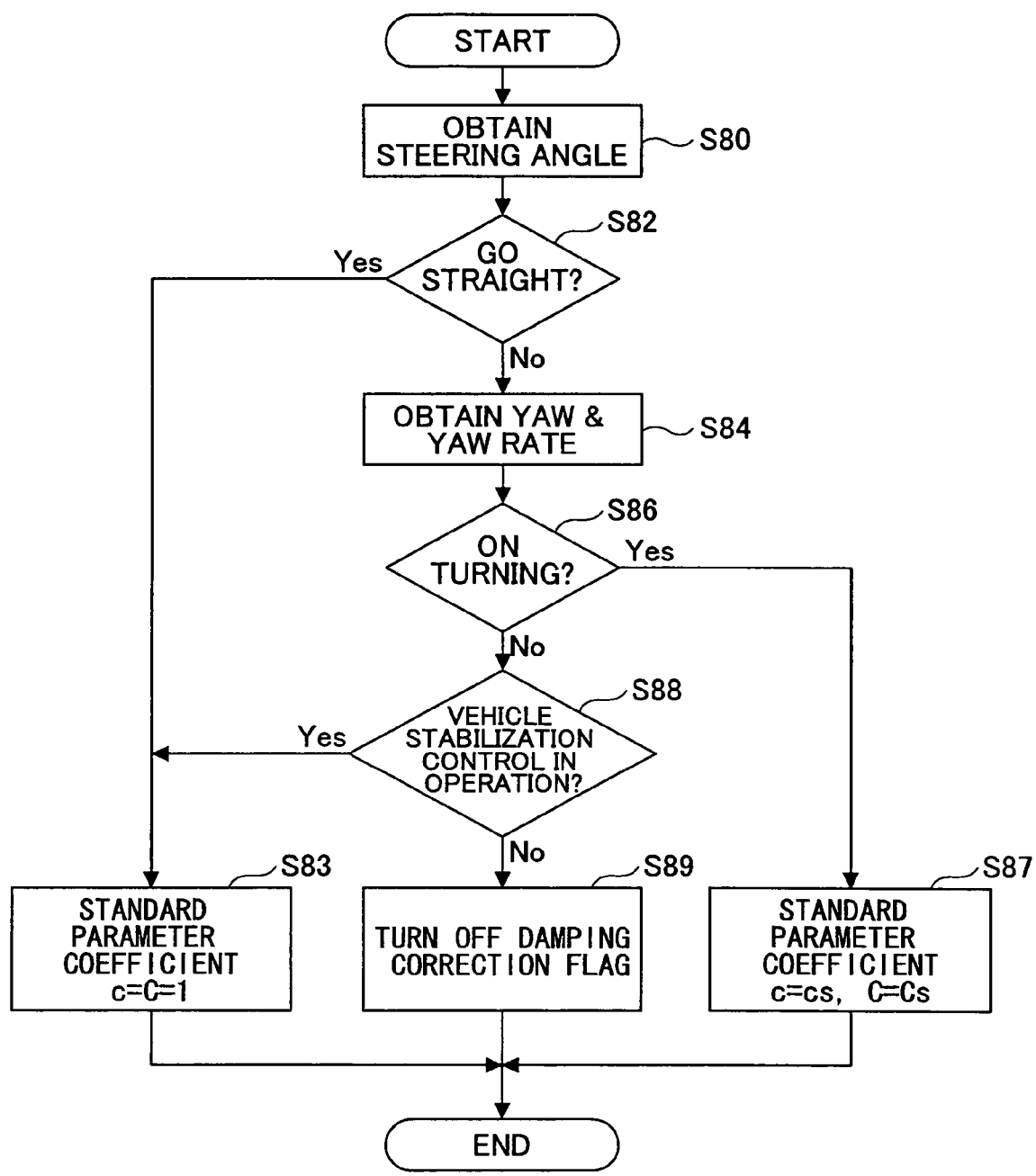
FIG. 7 shows a flow chart illustrating standard parameter coefficient setting processing carried out according to the vehicle running state.

After the processing of S4, or when the standard parameter coefficients ej and Ej are set in the above-mentioned S63, S65, S67, S71 of S73, the standard parameter coefficient setting of S8 is executed. FIG. 7 shows a flow chart illustrating the processing of setting the standard parameter coefficients according to a running state of the vehicle 1. As shown, on the occasion of the standard parameter coefficient setting, the first processor 11 of the driving control ECU 10 obtains (S80) the driver's operation amount of the operation wheel based on a signal from the steering angle sensor 16, and determines whether or not the vehicle 1 is in a straight forward running state (S82).

In the present embodiment, the above-mentioned standard parameters ωmi and ξmi are determined for a case where the vehicle 1 runs in a straight forward running state as a base. Therefore, when determining that the vehicle 1 is in a straight forward running state (Yes in S82), the first processor 11 sets '1' in each of a standard parameter coefficient c corresponding to the running state for therewith multiplying the standard parameter ωmi determined by means of the standard parameter setting processing S2 therewith, and a standard parameter coefficient C corresponding to the running state for therewith multiplying the standard parameter ξmi, for when running an ordinary road in an ordinary state (S83).

When determining that the vehicle 1 is not in a straight forward running state (No in S82), the first processor 11 obtains a yaw rate of the vehicle 1 from the yaw rate sensor (S84), and determines whether or not the vehicle 1 is turning (S86). When determining that the vehicle 1 is turning (Yes in S86), the first processor 11 sets 'cs' in a standard parameter coefficient c corresponding to the running state for therewith multiplying the standard parameter ωmi determined by means of the standard parameter setting processing S2, and sets 'Cs' in a standard parameter coefficient C corresponding to the running state for therewith multiplying the standard parameter ξmi, for when running an ordinary road in an ordinary state (S87). It is noted that these values 'cs' and 'Cs' are previously identified through experiment/analysis, and are stored in the storage device of the driving control ECU 10.

When determining that the vehicle 1 is not turning (No in S86), the first processor 11 determines form the ECBECU 20 whether or not the vehicle stabilization control is being executed (S88). When determining that the vehicle stabilization control is not being executed (Yes in S88), the first processor 11 determines that the vehicle 1 is in a straight forward running state, and sets '1' in each of the standard parameter coefficients c and C (S83). On the other hand, when determining that the ECBECU 20 is executing vehicle stabilization control (No in S88), the first processor turns off a predetermined damping correction flag so as to avoid execution of the processing subsequent to S2 in FIG. 3 (S89). That is, when the ECBECU 20 is executing vehicle stabilization control, running stability of the vehicle 1 should be given priority rather than vibration damping. Accordingly, in the present embodiment, when vehicle stabilization control is being executed, the damping correction flag is turned off so as to avoid execution of the correction processing for the target driving power Pt otherwise precision of the vehicle stabilization control may be adversely affected thereby.

Figure 8:
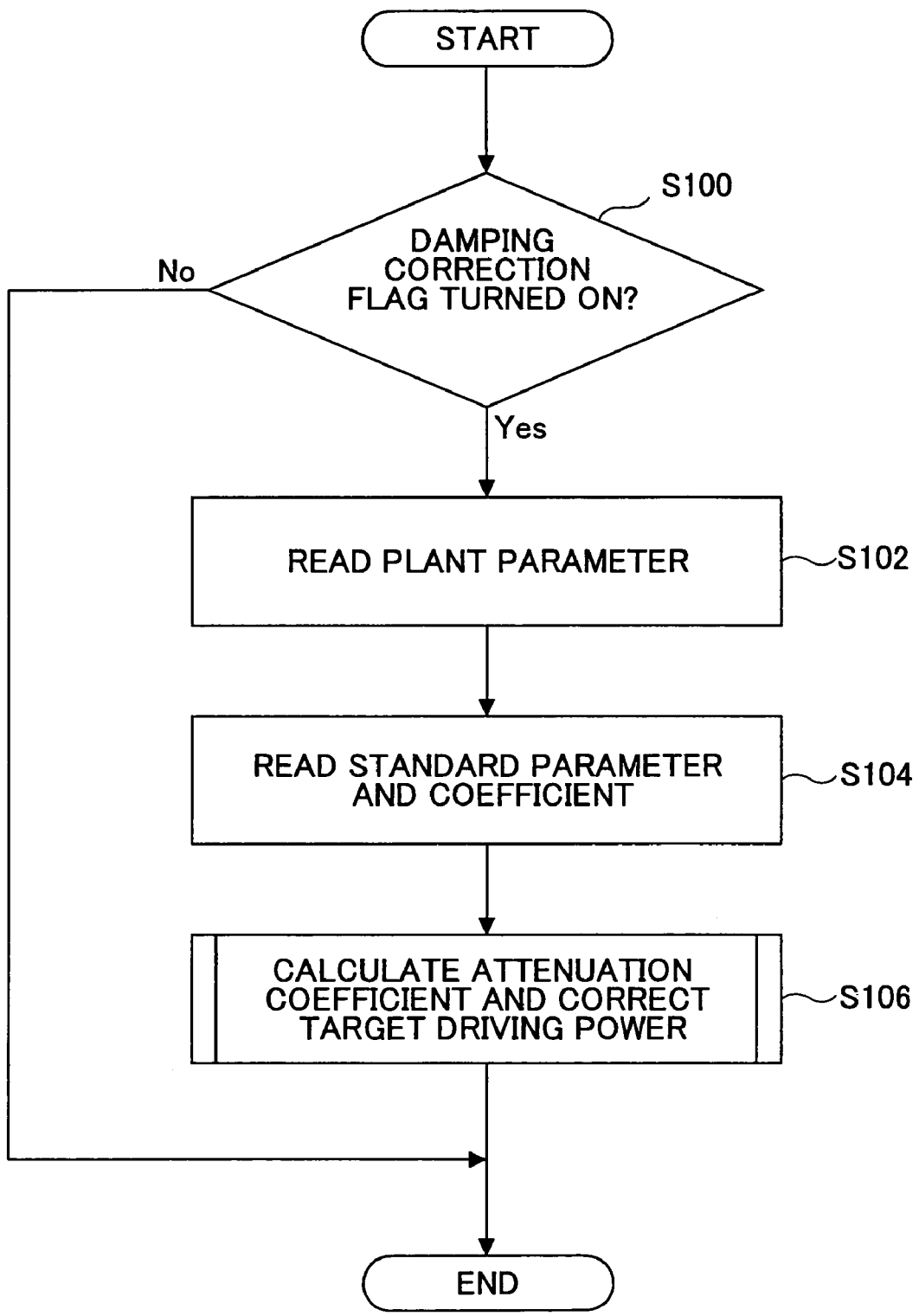
FIG. 8 shows a flow chart illustrating target driving power correcting processing.

The correction processing for the target driving power Pt in S10 is carried out after the standard parameters ωmi and ξmi, the plant parameters ωpi and ξpi, the standard parameter coefficients ej and Ej, c and C, are determined. FIG. 8 shows a flow chart illustrating the target driving power correction processing. As shown, the first processor 11 first determines whether or not the damping correction flag is turned on (S100). When determined that the damping correction flag is turned off (No in S100), it is determined that, as mentioned above, the vehicle stabilization control is being executed. Accordingly, in this case, the processing subsequent to S102 is skipped, and the correction processing for the target driving power Pt which may adversely affect the precision of the vehicle stabilization control is not executed.

When determining that the damping correction flag is turned on (Yes in S100), the first processor 11 reads the plant frequency ωpi and the plant attenuation ratio ξpi which are parameters set in the above-mentioned plant parameter setting processing (S4) from the predetermined storage device (S102). Further, the first processor 11 reads (S104), from the predetermined storage device, the standard frequency ωmi and the standard attenuation ratio ξmi which are plant parameters set in the above-mentioned standard parameter setting processing (S2), and also, reads, from the predetermined storage device, the standard parameter coefficients ej and Ej set in the above-mentioned standard parameter setting processing based on the running environment (S6), and the standard parameter coefficients c and C set in the standard parameter setting processing based on the running state (S8).

After carrying out S104, the first processor 11 substitutes, for ωp and ξp in the above-mentioned formula (2), the values of the plant frequency ωp and the plant attenuation ratio ξp read in S102, respectively, and also, substitutes, for ωm and ξm in the above-mentioned formula (2), the values obtained from the following formulas:

$$\omega m = \omega mi \times ej \times c$$

$$\xi m = \xi mi \times Ej \times C$$

Then, the first processor 11 transforms, with the use of the Tustin model (Tustin transform), the formula (2) in which the standard parameters and the plant parameters are thus substituted for, and obtains a correcting formula H(z) defining the attenuation characteristics of the filter 115 as in the formula (3) below, and, thereby, the target driving power Ptc after the correction is output by the filter 115 (S106) as:

$$Pct = Pt \times H(z)$$

In the formula (3) below, $z^{-1}$ denotes a preceding value of $Pt \times H(z)$ or Ptc, i.e., a preceding value of the target driving power after the correction, and $z^{-2}$ denotes a further preceding value of $Pt \times H(z)$ or Ptc, i.e., a further preceding value of the target driving power after the correction.

$$H(z) = \frac{b_{12} \cdot z^{-2} + b_{11} \cdot z^{-1} + b_{10}}{a_{12} \cdot z^{-2} + a_{11} \cdot z^{-1} + 1} = \frac{N_1}{D_1} \quad (3)$$

As described above, in the vehicle 1 in which the first processor 11 of the driving control ECU 10 carries out the above-described processing, on the occasion of correcting the target driving power Pt by means of the filter 115 as the correcting part according to the running environment information obtained by means of the environment information obtaining unit 17 such as the navigation system, and the running state as to whether or not the vehicle is turning, the attenuation characteristics of the filter 115 are changed. Accordingly, in the vehicle 1 provided with the driving control ECU 10, with reflecting the running characteristics set by the driver, the running environment and the running state of the vehicle 1, the target driving power Pt is corrected appropriately in such a manner as to damp the vehicle's on-spring vibration. Accordingly even when the running characteristics of the vehicle are changed by the driver or the running environment and/or the running state of the vehicle 1 are changed, vibration of the vehicle can be satisfactorily damped.

In the vehicle 1 provided with the electronically controlled throttle valve 5, the position of the throttle valve 4 is set according to the driver's operation amount of the throttle pedal detected by the throttle sensor 14. A case is assumed that a trouble may occur in the throttle pedal itself or the throttle sensor 14, by some cause. When a trouble thus occurs in the throttle pedal or the throttle sensor 14, the position of the throttle valve 4 cannot be controlled according to the driver's operation amount of the throttle pedal with a high accuracy. Therefore, in the vehicle 1, when the second processor 12 of the driving control ECU 10 controlling the throttle valve 4 makes a trouble determination for the throttle pedal and the throttle sensor 14 and thus determines that a throttle trouble occurs, the driving control ECU 10 executes throttle position control for causing the vehicle 1 to enter a saving running state.

Figure 9:
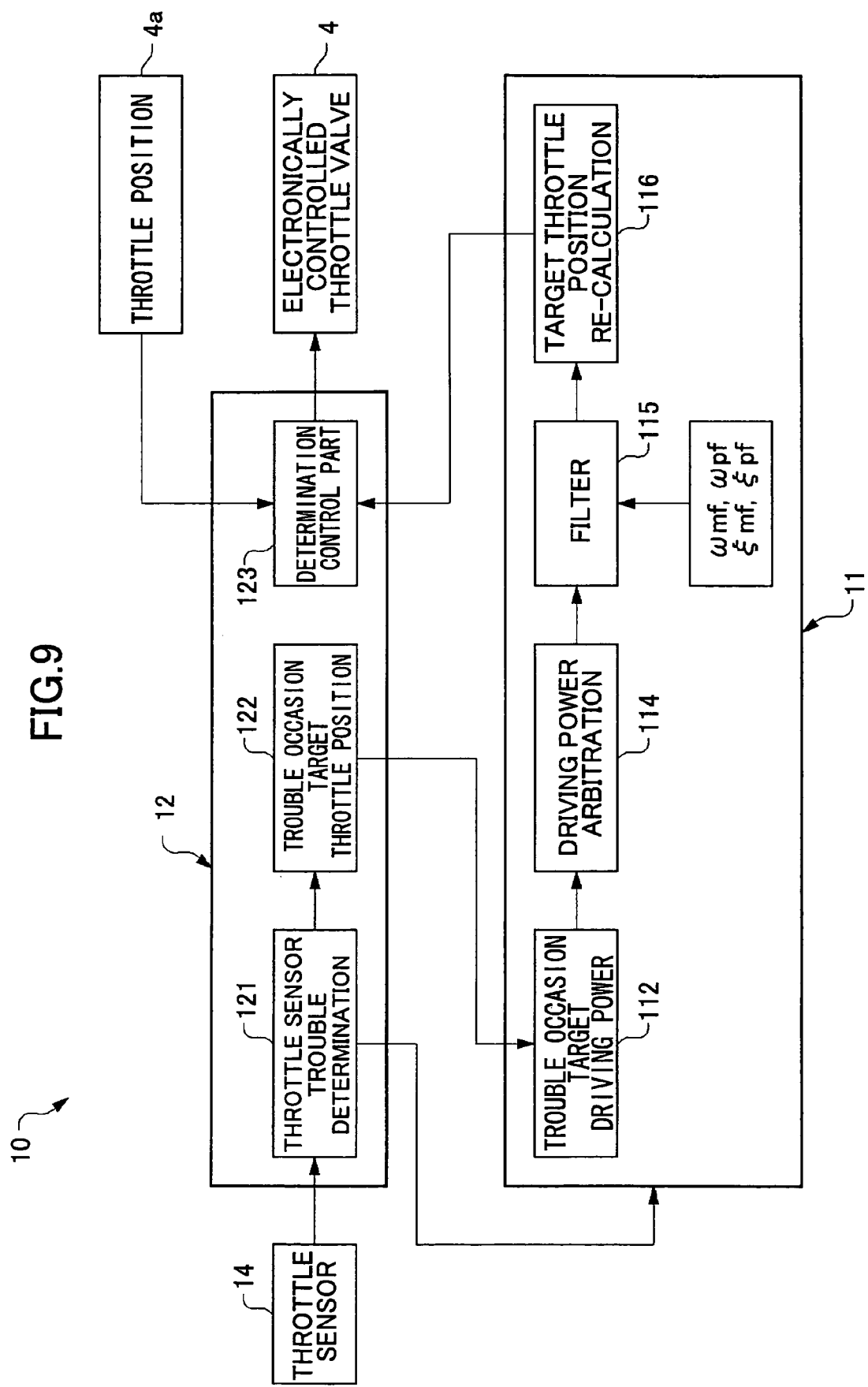
FIG. 9 shows a control block diagram illustrating a throttle position control procedure executed by the vehicle control apparatus according to the present invention for the purpose of dealing with a throttle trouble of the vehicle of FIG. 1.

In order to execute throttle position control on such a throttle trouble occasion, the second processor 12 of the driving ECU 10 includes, as shown in FIG. 9, a throttle trouble determining part 121, a trouble occasion target throttle position obtaining part 122 and a determination control part 123. The throttle trouble determining part 121 determines, based on a signal from the throttle sensor 14, whether or not a trouble occurs in at least any one of the throttle pedal and the throttle sensor 14. That is, the throttle trouble determining part 121 determines that a trouble has occurred in at least any one of the throttle pedal and the throttle sensor 14 when the throttle operation amount indicated by the signal from the throttle sensor 14 has an abnormal value, or no signal is received from the throttle sensor 14 at a predetermined timing. When determining that the throttle trouble has occurred, the throttle trouble determining part 121 provides a signal indicating this matter to the trouble occasion target throttle position obtaining part 122 and the first processor 11.

When the throttle trouble determining part 121 determines that the throttle trouble occurs, the trouble occasion target throttle position obtaining part 122 obtains, from the storage device, a trouble occasion target throttle positron which is a target throttle position for a throttle trouble, and provides a signal indicating the thus-obtained trouble occasion target throttle position, to the target driving power obtaining part 112 of the first processor 11. In the present embodiment, the trouble occasion target throttle position is basically determined in a fixed value. However, a plurality of trouble occasion target throttle positions may be prepared, and one thereof may be selected according to the running environment, the running state, or such, of the vehicle 1. The determination control part 123 generates a control signal for setting the position of the throttle valve to the target throttle position, and executes various sorts of determination processing.

Figure 10:
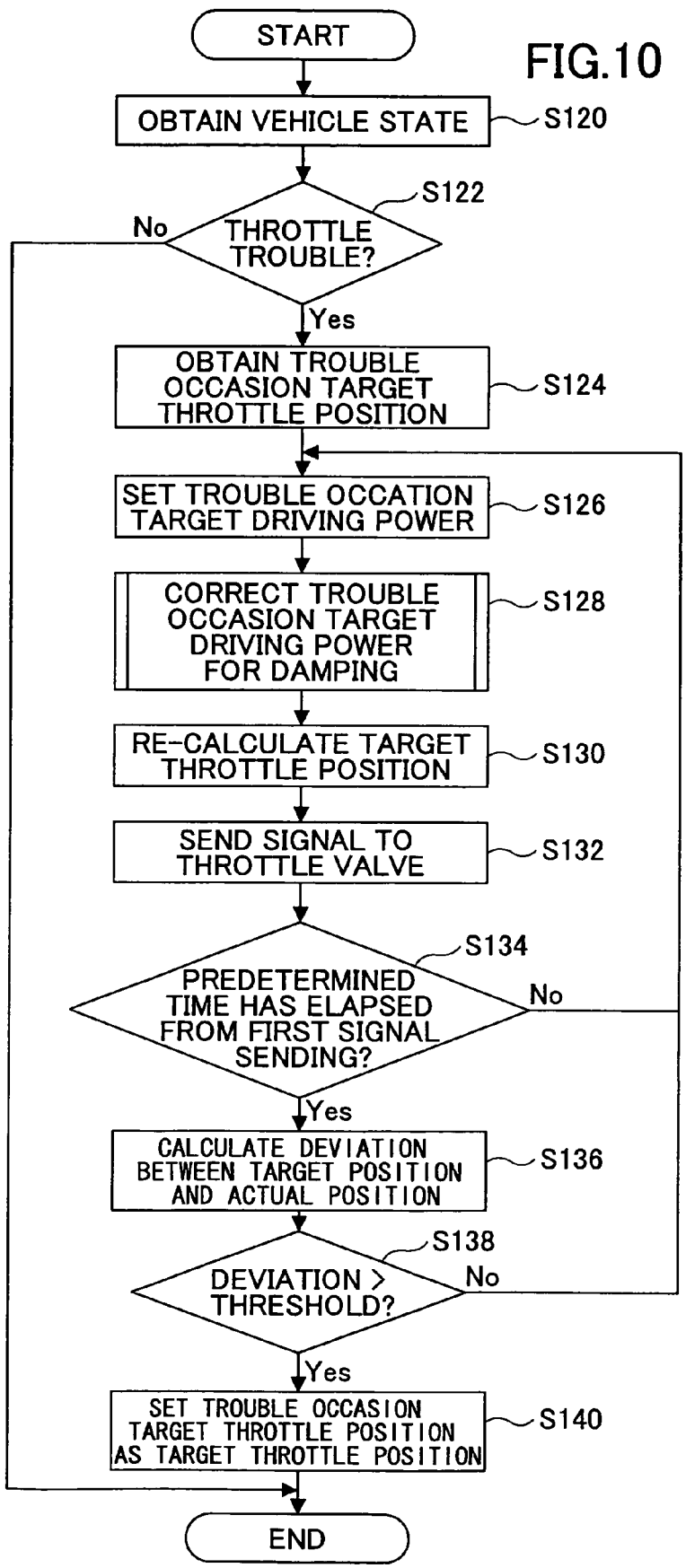
FIG. 10 shows a flow chart illustrating a throttle position control procedure executed by the vehicle control apparatus according to the present invention for the purpose of dealing with a throttle trouble of the vehicle of FIG. 1.

Next, with reference to FIG. 10, a throttle position control procedure executed by the driving control ECU 10 for dealing with the throttle trouble in the vehicle 1 is described. The processing shown in FIG. 10 is executed at a timing of the driving ECU 10 obtaining the state of the vehicle such as the vehicle speed of the vehicle 1, the gear ratio in the transmission 5, the operation amount of the throttle pedal, and so forth. When the information indicating the state of the vehicle 1 is obtained by the driving control ECU 10 (S120), the throttle trouble determining part 121 of the second processor 12 determines (S122) based on the signal from the throttle sensor 14 whether or not a trouble has occurred in at least any one of the throttle pedal and the throttle sensor 14. When the throttle trouble determining part 121 determiners that the throttle trouble has not occurred (No in S122), the processing subsequent to S124 is not carried out, and the processing subsequent to S120 is again executed repeatedly.

On the other hand, the throttle trouble determining part 121 determines that a trouble has occurred in at least any one of the throttle pedal and the throttle sensor 14 when the signal from the throttle sensor 14 indicates the throttle operation amount having an abnormal value or no signal is received from the throttle sensor 14 at the predetermined timing (Yes in S122). Then, the throttle trouble determining part 121 provides the signal indicating this matter, to the trouble occasion target throttle position obtaining part 122 of the second processor 12 and the first processor 11. When receiving the signal from the throttle trouble determining part 121, the trouble occasion target throttle position obtaining part 122 obtains the trouble occasion target throttle position which is the target throttle position for the throttle trouble, from the storage device (S124), and provides the signal indicating the thus-obtained trouble occasion target throttle position, to the target driving power obtaining part 112 of the first processor 11.

When receiving the signal indicating trouble occasion target throttle position, from the trouble occasion target throttle position obtaining part 122, the target driving power obtaining part 112 uses a predetermined function having, for example, the vehicle speed, the gear ratio of the transmission 5, the trouble occasion target throttle position, and so forth, as parameters, to calculates/sets the target deriving power of the vehicle 1 for the trouble occasion from the trouble occasion target throttle position, and so forth (S126). That is, on the occasion where the processing of FIG. 9 is carried out, the target driving power obtaining part 112 of the first processor 11 functions as a part of setting the target driving power for the trouble occasion, based on the trouble occasion target throttle position. The signal indicating the target driving power for the trouble occasion set by the target driving power obtaining part 112 is sent to the filter 115 via the driving power arbitration part 114, and the filter 115 executes damping correction processing for the target driving power for the trouble occasion (S128). It is noted that, when the signal indicating the occurrence of throttle trouble is provided to the first processor 11, the driving power arbitration part 114 does not carry out driving arbitration, but sends the signal from the target driving power obtaining part 112 to the filter as it is.

The damping correction processing for the target driving power for the trouble occasion (S128) is executed basically in the same procedure as that described above in relation with FIG. 8, and so forth, by the first processor. There, when the throttle trouble occurs, setting of the standard parameters ωm and ξm and the plant parameters ωp and ξp according to the running characteristics (running mode), the running environment and the running state of the vehicle 1 is not executed. That is, for when the throttle trouble occurs, based on the trouble occasion target throttle position, the standard parameters ωmf and ξmf and the plant parameters ωpf and ξpf for the trouble occasion are previously identified, and are stored in the storage device of the first processor 11. Then the first processor 11 reads these standard parameters ωmf and ξmf and plant parameters ωpf and ξpf from the storage device, and provides them for the correction processing of the filter 115.

A signal indicating the target driving power after the correction output from the filter 115 is sent to the control amount setting part 116. The control amount setting part 116 calculates (re-calculates), together with the control amounts for the fuel injection unit 2 and the ignition unit 3 of the internal combustion engine, and the control amount for the transmission 5, a control amount for the throttle valve 4, i.e., the target throttle position, based on the target driving power for the trouble occasion corrected by the filter 115 (S130). The control amount setting part 116 then provides the calculated target throttle position to the determination control part 123 of the second processor 12. The determination control part 123 generates a control signal for the throttle valve 4 based on the target throttle position received from the control amount setting part 116 of the first processor, and sends the signal to the throttle valve 4 (S132).

Thus, in the vehicle 1, when it is determined that a trouble occurs in the throttle pedal or the throttle sensor 14 (Yes in S122), the target driving power for the trouble occasion is set based on the predetermined trouble occasion target throttle position (S126). Then, the target driving power for the trouble occasion is corrected (S128) in such a manner as to damp on-spring vibration of the vehicle 1 by the filter 115, and, based on the corrected target driving power, the target throttle position of the throttle valve 4 is calculated (S130).

A transfer function having the target driving power of the vehicle 1 as an input and the stroke of the rear suspension of the vehicle 1 for example as an output can be expressed by the quadratic/quartic transfer function shown in the above-mentioned formula (1). By controlling the internal combustion engine and so forth based on the target driving power corrected by the quadratic notch filter which cancels the pole of the quadratic function inducing vibration included in this quadratic/quartic function, vibration of the vehicle 1 can be satisfactorily damped as described above. Accordingly, by correcting the target driving power for the trouble occasion determined based on the trouble occasion target throttle position by means of the filter 115 when it is determined that the trouble occurs in the throttle pedal or the throttle sensor 14, vibration of the vehicle 1 can be satisfactorily damped and behavior of the vehicle 1 can be stabilized, and, at the same time, the running state of the vehicle 1 can be changed into the running state based on the trouble occasion target control amount, smoothly.

When transmitting the first signal indicating the target throttle position calculated based on the target driving power corrected by the filter 115, the determination control part 123 turns on a predetermined timer, and starts measurement of a time elapsing from the time of transmission of the signal to the throttle valve 4. Then, the determination control part 123 determines (S134) whether or not the elapsing time has reached a predetermined time Tr. When determining that the elapsing time from the time of first signal transmission has not reached the predetermined time Tr (No in S134), the determination control part 123 causes the trouble occasion target throttle position obtaining part 122 to transmit the signal indicating the trouble occasion target throttle position to the target driving power obtaining part 112 of the first processor 11. Thereby, when the negative determination is made in S134, as shown in FIG. 10, the processing of S126 through S132 is thus repeated. When the vehicle 1 is stopped while the processing of S126 through S132 is repeated, this routine is finished.

Figure 11:
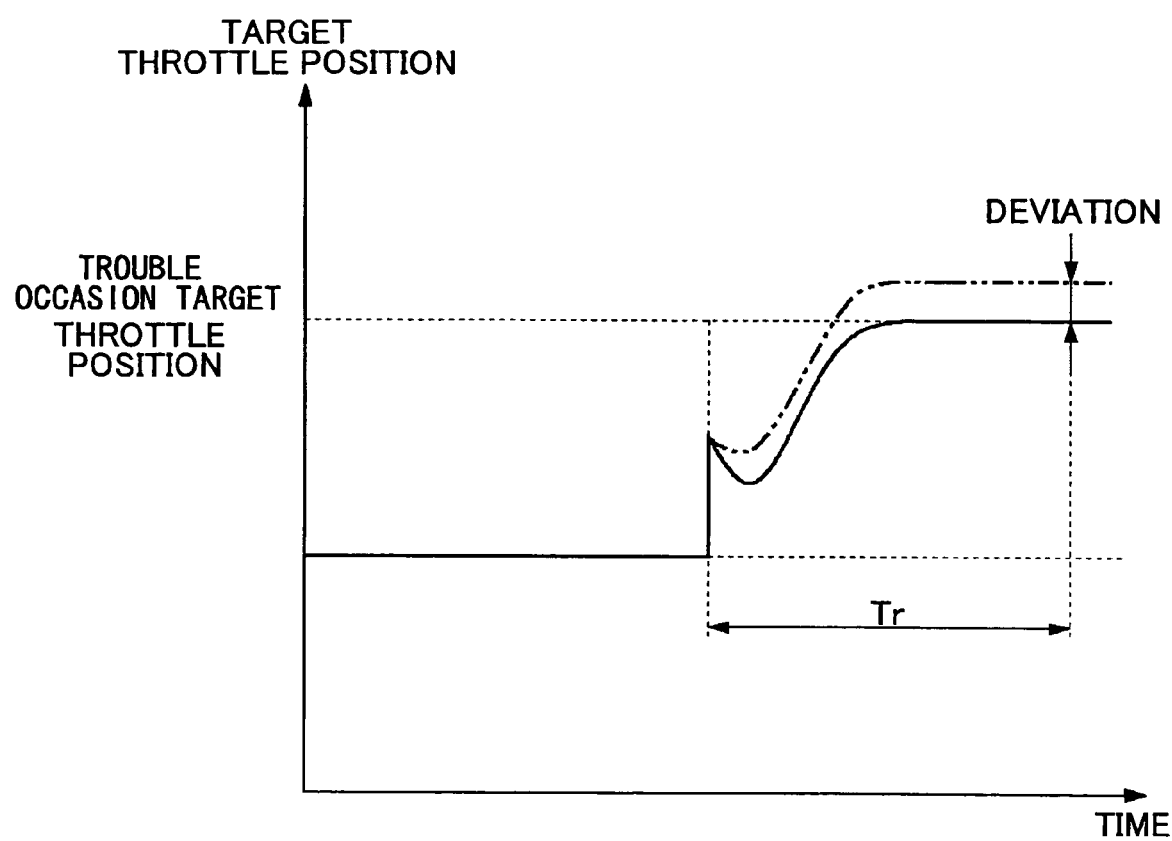
FIG. 11 shows a graph showing a transition of the target throttle position on the occasion of occurrence of a throttle trouble.

As a result of the processing of S126 through S132 being thus repeatedly executed, the target throttle position indicated by the control signal provided to the throttle valve 4 by the determination control part 123 has a waveform such as that shown in FIG. 11, and, as shown by a solid curve in the figure, it converges on the predetermined trouble occasion target throttle position as time goes on. However, when a control error increases by some cause or so, the target throttle position indicated by the control signal provided to the throttle valve 4 from the determination control part 123 may not become coincident with the trouble occasion target throttle position even in a stage in which the predetermined time Tr has elapsed from the time of transmission of the first signal indicating the target throttle position calculated based on the target driving power corrected by the filter 115, as shown by a chain double-dashed curve of FIG. 11.

Therefore, when determining that the predetermined time Tr has elapsed from the time of transmission of the first signal (Yes in S134), the determination control part 123 of the second processor 12 obtains the position of the throttle valve 4 at the current time (actual throttle position) from the throttle position sensor 4a, and also, calculates a deviation between the target throttle position and the actual throttle position at the current time (S136). Then, the determination control part 123 determines whether or not the deviation exceeds a threshold (S138). When it is determined that the deviation does not exceed the threshold (No in S138), the processing subsequent to S126 is repeatedly executed.

When it is determined that the deviation exceeds the threshold (Yes in S138), the determination control part 123 determines that the target throttle position does not converge on the trouble occasion target throttle position, invalidates the target throttle position from the first processor 11, and then, sets the trouble occasion target throttle position as the target throttle position (S140). Then, the determination control part 123 finishes the current routine, and starts processing of controlling the throttle valve 4 in such a manner that the trouble occasion target throttle position is set as the target throttle position. Thus, even when, by some cause, a situation occurs in which the target throttle position calculated based on the target driving power corrected by the filter 115 does not converge on the trouble occasion target throttle position, finally the position of the throttle valve 4 is set to the trouble occasion target throttle position, and thus the vehicle 1 can be made to enter the saving running state.

It is noted that, as to the throttle position control for causing the vehicle 1 to enter the saving running state, as the filter 115, a filter defining attenuation characteristics by a transfer function of the formula (4) below may be employed. When such a filter is employed, even though the sampling effect may slightly degrade, the running state of the vehicle 1 can be made to smoothly enter the running state based on the trouble occasion target control amount.

$$C(s) = \frac{\omega_f^2}{s^2 + 2\xi_f \cdot \omega_f \cdot s + \omega_f^2} \quad (4)$$

Further, the present invention is not limited to the above-described embodiment, and variations and modifications may be made without departing from the basic concept of the present invention claimed below.

The present application is based on Japanese priority application No. 2005-173489, field on Jun. 14, 2005, the entire contents of which are hereby incorporated herein by reference.

What is claimed is:

1. A vehicle control apparatus which sets a predetermined target control amount concerning running of a vehicle according to an operation amount of a predetermined operation member for running the vehicle, comprising:
   an operation amount obtaining part obtaining the operation amount of said operation member;
   a trouble determining part determining whether or not a trouble occurs in at least any one of said operation member and said operation amount obtaining part;
   a target control amount setting part setting a trouble occasion target control amount which is the target control amount for trouble occasion, when said trouble determining part determines that a trouble occurs in at least any one of said operation member and said operation amount obtaining part; and
   a correcting part correcting said trouble occasion target control amount set by said trouble occasion target control amount setting part in such a manner as to damp on-spring vibration of said vehicle.

2. The vehicle control apparatus as claimed in claim 1, wherein:
   said operation member comprises a throttle pedal, and said target control amount comprises a target driving power of said vehicle; and
   a target throttle position obtaining part is provided for obtaining a predetermined trouble occasion target throttle position which is a throttle valve target position for trouble occasion, when said trouble determining part determines that a trouble occurs in at least any one of said operation member and said operation amount obtaining part, wherein:
   said target control amount setting part sets the trouble occasion target driving power based on the trouble occasion target throttle position obtained by said target throttle position obtaining part.

3. The vehicle control apparatus as claimed in claim 2, wherein:
   said correcting part comprises a quadratic notch filter having attenuation characteristics such as to attenuate the on-spring vibration of the vehicle.

4. A throttle trouble handling method for a case where a trouble occurs in at least any one of a throttle pedal of a vehicle and a throttle operation amount obtaining part configured to obtain the throttle pedal operation amount, comprising the steps of:
   determining whether or not a trouble occurs in at least any one of said throttle pedal of the vehicle and said throttle operation amount obtaining part;
   obtaining a trouble occasion target throttle position which is a target throttle position for trouble occasion, when said trouble determining part determines that a trouble occurs in at least any one of said throttle pedal and said throttle operation amount obtaining part;
   setting a trouble occasion target driving power which is the vehicle target driving power for trouble occasion, based on the trouble occasion target throttle position; and
   correcting said trouble occasion target control amount in such a manner as to damp on-spring vibration of said vehicle.

* * * * *